United States Patent [19]

Ohmori et al.

[11] Patent Number: 5,657,318
[45] Date of Patent: Aug. 12, 1997

[54] PHASE-COMPARISON BIT SYNCHRONIZING CIRCUIT

[75] Inventors: Hisakazu Ohmori; Yoshinori Ishii, both of Kawasaki, Japan

[73] Assignee: Fujitsu Limited, Kawasaki, Japan

[21] Appl. No.: 507,206

[22] Filed: Jul. 26, 1995

[30] Foreign Application Priority Data

Oct. 20, 1994 [JP] Japan ................................ 6-255609

[51] Int. Cl.⁶ ...................... H04J 3/06; H04J 3/16; H04J 3/12
[52] U.S. Cl. ................. 370/516; 370/506; 375/354; 375/371
[58] Field of Search ................... 370/105.1, 103, 370/100.1, 105.3, 97, 105.5, 112; 375/354, 371, 376, 368, 324; 327/141, 147, 156

[56] References Cited

U.S. PATENT DOCUMENTS

| | | | |
|---|---|---|---|
| 4,543,652 | 9/1985 | Amada et al. | 370/105.1 |
| 5,099,477 | 3/1992 | Taniguchi et al. | 370/97 |
| 5,148,430 | 9/1992 | Kuranaga et al. | 370/100.1 |
| 5,177,740 | 1/1993 | Toy et al. | 370/105.1 |
| 5,258,980 | 11/1993 | Maebara et al. | 370/100.1 |
| 5,259,004 | 11/1993 | Nakayama | 370/105.1 |
| 5,452,305 | 9/1995 | Nagatake et al. | 370/105.3 |

Primary Examiner—Wellington Chin
Assistant Examiner—Melissa Kay Carman
Attorney, Agent, or Firm—Staas & Halsey

[57] ABSTRACT

A phase-comparison bit synchronizing circuit for establishing bit phase synchronization of signals transmitted by way of TDMA can reproduce data properly even in the presence of disturbance. A plurality of phase shifting units shift the phase of a given burst signal in a received frame, and a bit phase synchronizing unit synchronizes the bit phases of output signals from the phase shifting units. A determining unit determines an optimum one of the phase shifting units, and a first selecting/outputting unit selects and outputs a signal which is produced when the given burst signal is shifted in phase by the optimum phase shifting unit. A memory unit stores the identification code of the phase shifting unit which is determined by the determining unit. A second selecting/outputting unit selects a signal produced when a burst signal in a next or succeeding received frame which corresponds to the given burst signal is shifted by the phase shifting unit whose identification code has been stored by the memory unit, and synchronized in bit phase by the bit phase synchronizing unit, and outputs the selected signal as bit reproduced data.

6 Claims, 10 Drawing Sheets

PHASE-COMPARISON BIT SYNCHRONIZING CIRCUIT

BACKGROUND OF THE INVENTION

(1) Field of the Invention

The present invention relates to a phase-comparison bit synchronizing circuit for establishing bit phase synchronization of signals transmitted by way of TDMA (Time-Division Multiplex Access), and more particularly to a phase-comparison bit synchronizing circuit in a receives for receiving, over a single optical fiber transmission path, bursts of signals transmitted from a plurality of subscribers.

(2) Description of the Related Art

There have been plans in recent years to give telephone subscribers highly sophisticated services such as for providing multimedia information.

Such highly sophisticated services involve a vast amount of information to be transmitted to the telephone subscribers. Since such a vast amount of information cannot be handled by conventional metallic telephone wires, it is necessary to construct subscriber lines of optical fibers.

One of the networks available for subscriber lines of optical fibers is a passive optical network (PON) as shown in FIG. 6 of the accompanying drawings. As shown in FIG. 6, a single optical fiber (main track) 102 from a central telephone office 101 is branched by an optical coupler 103 into a plurality of optical fibers (branch lines) 104~109 that are connected to respective subscriber's homes 110~115. The PON allows subscriber's homes scattered in a wide area to be economically and efficiently accommodated with a few optical fibers (main tracks) from the central telephone office.

The PON employs a TDMA process, for example, for upstream communications from the subscriber's homes 110~115 to the central telephone office 101. According to the TDMA process, burst signals are transmitted at predetermined different times respectively from the subscriber's homes 110~115 to the central telephone office 101, such that the burst signals from respective subscribers 1, 2, 3, 4, ... are arranged without being superposed in each frame for time-division multiplexing as shown in FIG. 7 of the accompanying drawings. The central telephone office 101 receives frames of multiplexed signals, and determines from which subscriber each of the burst signals is transmitted based on the sequence of the burst signals. The sequence of the burst signals remains unchanged in the frames.

The signals transmitted from the subscriber's homes 110~115 are held in synchronism with downstream signals from the central telephone office 101. Therefore, frequency synchronization is basically established in the receiving circuit in the central telephone office 101. Since the lengths of the optical fibers (branch lines) 104~109 are different from each other because of the different locations of the subscriber's homes 110~115, the burst signals transmitted from the subscriber's homes 110~115 to the central telephone office 101 are out of bit phase with each other. Consequently, the receiving circuit in the central telephone office 101 is required to establish bit phase synchronization of each of the burst signals.

Using a bit synchronizing circuit for each of the burst signals is not practical because as many bit synchronizing circuits would be required as the number of subscribers. One solution is to use a phase-comparison bit synchronizing circuit.

As shown in FIG. 8 of the accompanying drawings, a phase-comparison bit synchronizing circuit shifts the bit phases of the burst signals from the subscribers 1, 2, 3, ... with delay elements or the like, so that the burst signals are stably synchronized with a bit clock signal in the receiving circuit. Stated otherwise, the bit phases of the burst signals are adjusted individually in order to align the central positions of the bits of the burst signals with respective positive-going edges of the bit clock signal in the receiving circuit. In this manner, the bit data of the burst signals can be reproduced. While the burst signals are shown as being composed of several bits in FIG. 8 for illustrative purpose, they are actually composed of several tens to several thousands bits.

The arrangement of a conventional phase-comparison bit synchronizing circuit will be described below with reference to FIG. 9 of the accompanying drawings. Signals in the conventional phase-comparison bit synchronizing circuit are shown in FIG. 10 of the accompanying drawings, and which will be referred to in the description given below.

A given burst signal that is transmitted from the subscriber 1 indicated at $\hat{1}$ in FIG. 10 is supplied successively to seven series-connected delay elements (DL) 121~127 of the conventional phase-comparison bit synchronizing circuit. The delay time of each of the delay elements 121~127 is one-eighth of the period of the bit clock signal in the receiving circuit. The given burst signal itself and delayed signals from the delay elements 121~127, which are shifted in phase from the given burst signal, are then supplied to the respective D terminals of a D flip-flop (F/F) 128. The signals supplied to the respective D terminals of the D flip-flop 128 are indicated respectively by $\hat{1}$-a~$\hat{1}$-h in FIG. 10. The D flip-flop 128 has a clock terminal supplied with the bit clock signal in the receiving circuit. The bit clock signal is indicated by $\hat{2}$ in FIG. 10. As indicated by $\hat{1}$ in FIG. 10, the burst signal from each of the subscribers comprises three areas, i.e., a preamble (PR), a frame (FR), and data. The pressable (PR) is composed of a sequence of bits "1, 0", and used to establish bit phase synchronization and adjust the amplification factor of a receiving amplifier. The frame (FR) is used to establish frame synchronization of the burst signal.

The D flip-flop 128 synchronizes the signals supplied respectively to the D terminals thereof with positive-going edges of the bit clock signal supplied to the clock terminal thereof, and output signals indicated by $\hat{3}$-a~$\hat{3}$-h in FIG. 10. Specifically, the D flip-flop 128 outputs the signals supplied respectively to the D terminals thereof at the times of the positive-going edges of the bit clock signal, and keeps the outputted signals until the next positive-going edges of the bit clock signal.

A phase comparator 129 compares the output signals from the D flip-flop 128, i.e., compares adjacent ones of the signals indicated by $\hat{3}$-a~$\hat{3}$-h in FIG. 10 in the indicated sequence to detect signals whose data has changed. In the example shown in FIG. 10, a data change occurs between the signals $\hat{3}$-a, $\hat{3}$-b, and also between the signals $\hat{3}$-e, $\hat{3}$-f. These signals whose data has changed are considered to have a minimum margin when they are synchronized with the bit clock signal in the receiving circuit. The phase comparator 129 selects signal which is 180° out of phase with these signals, i.e., a signal whose setup, hold margins are largest with respect to the bit clock signal. In the example shown in FIG. 10, the phase comparator 129 selects the signal $\hat{3}$-c or $\hat{3}$-d or the signal or $\hat{3}$-h. The phase comparator 129 supplies a selector (SEL) 130 with an input terminal signal which is a coded representation of any one of input terminals of the selector 130 to which the signal selected by the phase comparator 129 is applied.

The input terminals of the selector 130 are supplied with the respective output signals from the D flip-flop 128. The selector 130 selects only the signal applied to the input terminal thereof which is indicated by the input terminal signal that is supplied from the phase comparator 129, and supplies the selected signal to the D terminal of a D flip-flop (F/F) 131. The D flip-flop 131 shapes the waveform of the signal supplied to the D terminal thereof based on the bit clock signal that is supplied to a clock terminal thereof, and outputs the shaped waveform as bit reproduced data.

The conventional phase-comparison bit synchronizing circuit of the above arrangement adjusts the phase of a burst signal while its preamble (PR) is being inputted so that the burst signal can stably be synchronized with the bit clock signal in the receiving circuit. The frame (FR) and data of a succeeding burst signal also pass through the selected delay element. Therefore, the frame (FR) and the data are also adjusted in phase, and are stably synchronized with the bit clock signal in the receiving circuit.

Each time a new burst signal, i.e., a burst signal from another subscriber such as the subscriber 2 as indicated at 1 in FIG. 10, is inputted, the conventional phase-comparison bit synchronizing circuit selects the amount of a new phase shift to be made. Even when a next frame is reached and the burst signal from the subscriber 1 is inputted, the conventional phase-comparison bit synchronizing circuit selects the amount of a new phase shift to be made.

The conventional phase-comparison bit synchronizing circuit is arranged to determine the amount of a new phase shift to be made for phase adjustment each time a burst signal is inputted in each frame from the same subscriber.

The amount of a phase shift is determined in relation to the length of the branch line of each subscriber. Therefore, the amount of a phase shift to be made with respect to burst signals from the same subscriber does not basically vary in each frame, and hence may not be determined each time a burst signal is inputted from the same subscriber.

If the amount of a phase shift to be made is determined each time a burst signal is inputted from the same subscriber and the determined amount varies, then the preamble of the burst signal is considered to suffer a problem due to disturbance. When phase adjustment is made based on such a wrong amount of a phase shift, burst signals may not be synchronized in appropriate bit phase, and may have different data error rates.

SUMMARY OF THE INVENTION

It is therefore an object of the present invention to provide a phase-comparison bit synchronizing circuit which is capable of reproducing data properly even in the presence of disturbance.

To achieve the above object, there is provided in accordance with the present invention a phase-comparison bit synchronizing circuit for establishing bit phase synchronization of signals transmitted by way of time-division multiplex access, comprising a plurality of phase shifting means for shifting the phase of a given burst signal in a received frame by respective amounts which are different from each other, bit phase synchronizing means for synchronizing the bit phases of output signals from the phase shifting means based on a predetermined clock signal, determining means for comparing output signals from the bit phase synchronizing means and determining an optimum one of the phase shifting means, first selecting/outputting means for selecting a signal produced when the given burst signal is shifted in phase by the phase shifting means determined by the determining means, and synchronized in bit phase by the bit phase synchronizing means, and outputting the selected signal as bit reproduced data, memory means for storing an identification code of the phase shifting means determined by the determining means, and second selecting/outputting means for selecting a signal produced when a burst signal in a next or succeeding received frame which corresponds to the given burst signal is shifted by the phase shifting means whose identification code has been stored by the memory means, and synchronized in bit phase by the bit phase synchronizing means, and outputting the selected signal as bit reproduced data.

According to the present invention, there is also provided a phase-comparison bit synchronizing circuit for establishing bitphase synchronization of signals transmitted by way of time-division multiplex access, comprising a plurality of phase shifting means for shifting the phase of a reference clock signal by respective amounts which are different from each other, a plurality of bit phase synchronizing means for synchronizing the bit phase of a given burst signal in a received frame based on respective output signals from the phase shifting means, determining means for comparing output signals from the bitphase synchronizing means and determining an optimum one of the bitphase synchronizing means, first selecting/outputting means for selecting a signal produced when the given burst signal is synchronized in bit phase by the bit phase synchronizing means determined by the determining means, and outputting the selected signal as bit reproduced data, memory means for storing an identification code of the bit phase synchronizing means determined by the determining means, and second selecting/outputting means for selecting a signal produced when a burst signal in a next or succeeding received frame which corresponds to the given burst signal is synchronized in bit phase by the bit phase synchronizing means whose identification code has been stored by the memory means, and outputting the selected signal as bit reproduced data.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

The principles of the present invention will be described below with reference to FIG. 1.

Figure 1:
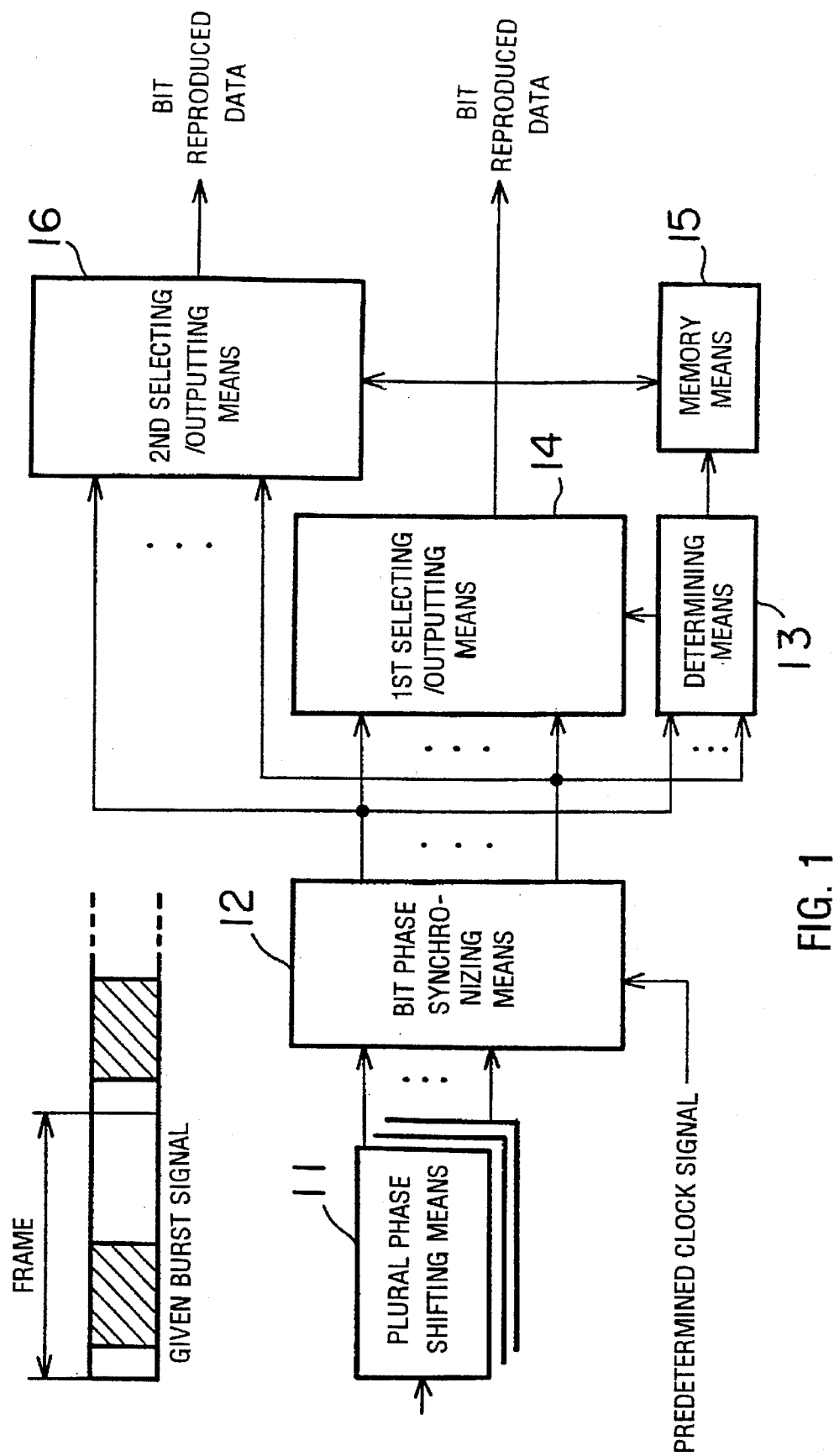
FIG. 1 is a block diagram illustrative of the principles of the present invention.

As shown in FIG. 1, a phase-comparison bit synchronizing circuit according to the present invention comprises a plurality of phase shifting means 11 for shifting the phase of a given burst signal in a received frame by respective different amounts, a bit phase synchronizing means 12 for synchronizing the bit phases of output signals from the phase shifting means 11 based on a predetermined clock signal, a determining means 13 for comparing output signals from the bit phase synchronizing means 12 and determining an optimum one of the phase shifting means 11, a first selecting/outputting means 14 for selecting a signal produced when the given burst signal is shifted in phase by the phase shifting means 11 determined by the determining means 13, and synchronized in bit phase by the bit phase synchronizing means 12, and outputting the selected signal as bit reproduced data, memory means 15 for storing the identification code of the phase shifting means 11 determined by the determining means 13, and a second selecting/outputting means 16 for selecting a signal produced when a burst signal in a next or succeeding received frame which corresponds to the given burst signal is shifted by the phase shifting means 11 whose identification code has been stored by the memory means 15, and synchronized in bit phase by the bit phase synchronizing means 12, and outputting the selected signal as bit reproduced data.

The phase shifting means 11, the bit phase synchronizing means 12, the determining means 13, and the first selecting/outputting means 14 operate in the same manner as the conventional phase-comparison bit synchronizing circuit.

According to the present invention, the memory means 15 stores the identification code of the phase shifting means 11 which has been determined by the determining means 13. When a burst signal in a next or succeeding received frame which corresponds to the given burst signal is inputted, the inputted burst signal is shifted in phase by the phase shifting means 11 whose identification code has been stored by the memory means 15, and synchronized in bit phase by the bitphase synchronizing means 12. A signal produced by thus shifting and synchronizing the inputted burst signal is selected by the second selecting/outputting means 16, and outputted as bit reproduced data.

Specifically, when a next or succeeding frame is received, no new phase shifting means is determined by the determining means 13, but the phase shifting means whose identification code has been stored by the memory means 15 and which has been used in the preceding frame is used with respect to a burst signal in the received frame which corresponds to the given burst signal.

Therefore, even when the next or succeeding received frame suffers disturbance, phase adjustment based on a wrong amount of a phase shift is avoided, and burst signals can be synchronized in appropriate bit phase. Burst signals are prevented from having different data error rates. Consequently, data can be reproduced properly even in the presence of disturbance.

Embodiments of the present invention will now be described below in specific detail.

Figure 2:
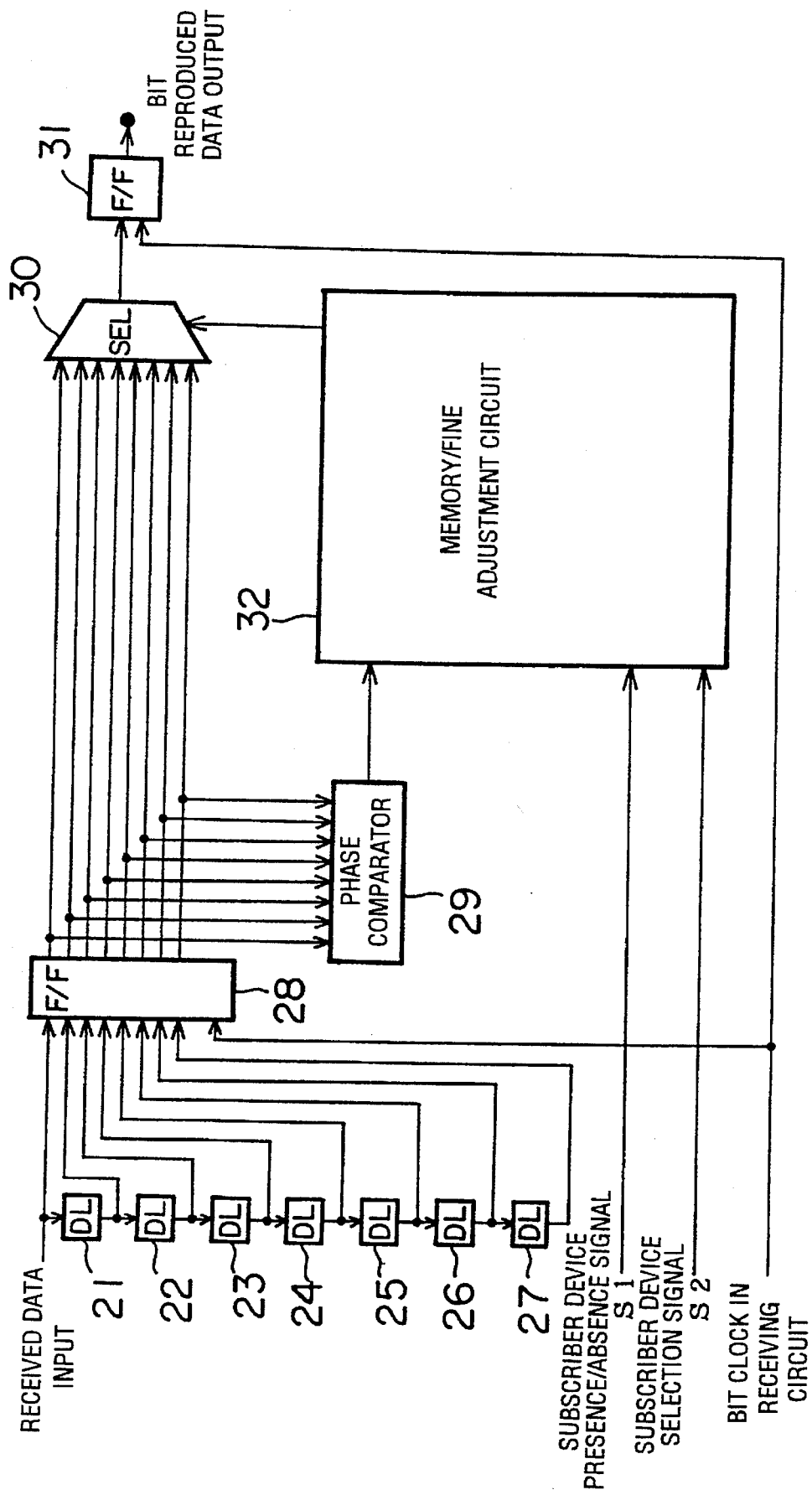
FIG. 2 is a block diagram of a phase-comparison bit synchronizing circuit according to a first embodiment of the present invention.

FIG. 2 shows in block form a phase-comparison bit synchronizing circuit according to a first embodiment of the present invention. As shown in FIG. 2, the phase-comparison bit synchronizing circuit according to the first embodiment has delay elements (DL) 21–27, a D flip-flop (F/F) 28, a phase comparator 29, a selector (SEL) 30, and a D flip-flop (F/F) 31 which are identical structurally and functionally to the delay elements 121–127, the D flip-flop 128, the phase comparator 129, the selector 130, and the D flip-flop 131 shown in FIG. 9. However, the phase comparator 29 is connected to the selector 30 through a memory/fine adjustment circuit 32.

The memory/fine adjustment circuit 32 is supplied with an input terminal signal from the phase comparator 29 and a subscriber device presence/absence signal S1 and a subscriber device selection signal S2 from a communication circuit (not shown) connected to a stage subsequent to the phase-comparison bit synchronizing circuit. The subscriber device presence/absence signal S1 is a signal indicating whether a burst signal from a subscriber has been present in a preceding frame or not. Basically, the subscriber device presence/absence signal S1 represents "absence" with respect to burst signals from any subscribers in a first frame, and represents "presence" with respect to burst signals from any subscribers in a second or later frame. The subscriber device selection signal S2 is a signal indicating from which subscriber an inputted burst signal has been supplied.

Figure 3:
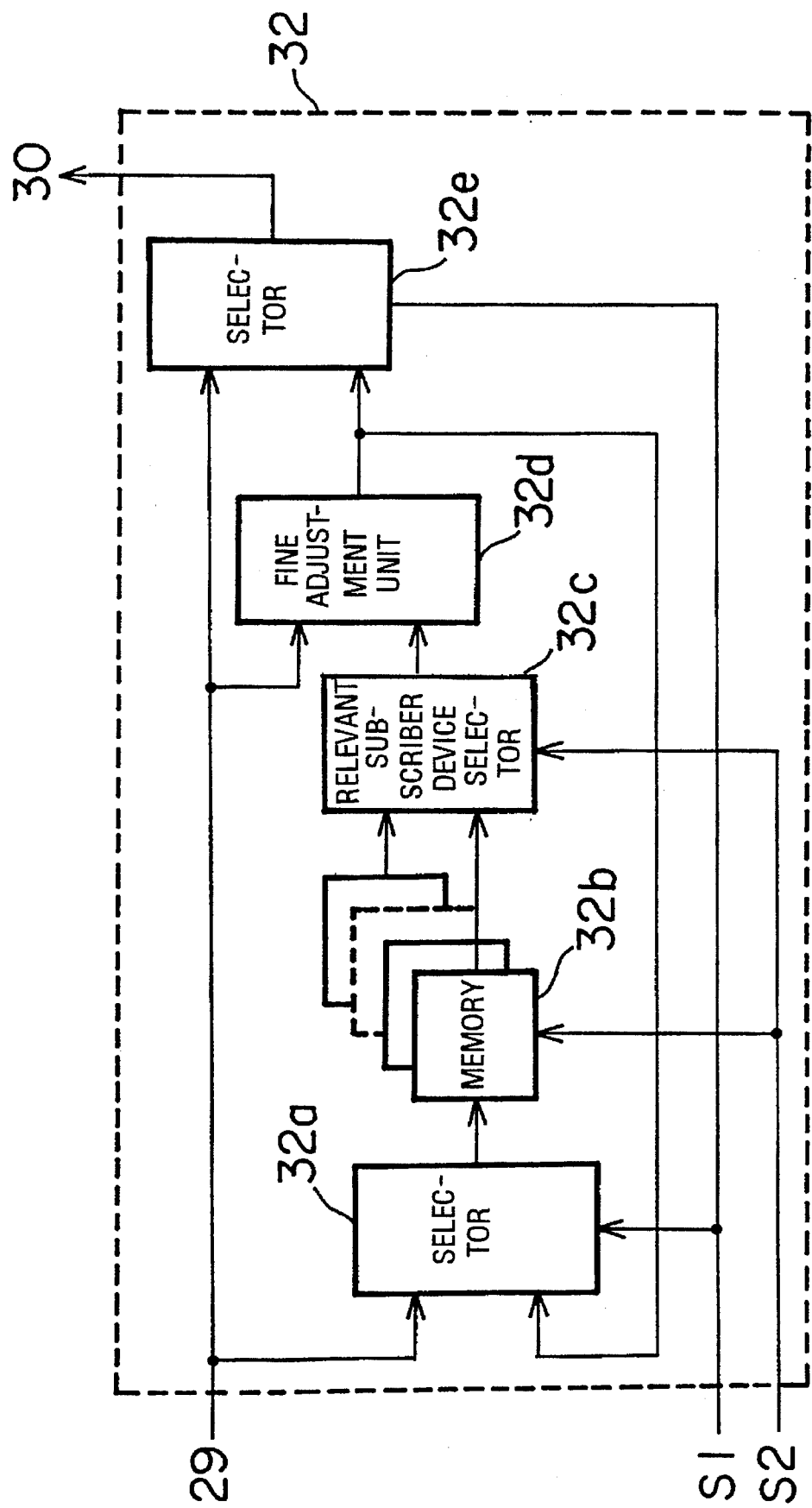
FIG. 3 is a block diagram of an internal arrangement of a memory/fine adjustment circuit in the phase-comparison bit synchronizing circuit according to the first embodiment.

FIG. 3 shows in block form an internal arrangement of the memory/fine adjustment circuit 32. The memory/fine adjustment circuit 32 has a selector 32a, a memory 32b, a relevant subscriber device selector 32c, a fine adjustment unit 32d, and a selector 32e. The selector 32a, the fine adjustment unit 32d, and the selector 32e have respective first input terminals supplied with the input terminal signal from the phase comparator 29. The selector 32a applies a selected output signal to the memory 32b. The memory 32b has storage locations assigned respectively to the subscribers. The memory 32b selects one of the storage locations which corresponds to the subscriber that is indicated by the subscriber device selection signal S2, and stores the input terminal signal from the selector 32a into the selected storage location. The memory 32b has an output terminal connected to the relevant subscriber device selector 32c, which reads the input terminal signal stored in the storage location in the memory 32b which corresponds to the subscriber that is indicated by the subscriber device selection signal S2, and outputs the read input terminal signal to a second input terminal of the fine adjustment unit 32d. The fine adjustment unit 32d compares the input terminal signals supplied to its respective input terminals. If the compared input terminal signals agree with each other, then the fine adjustment unit 32d outputs the input terminal signal. If the compared input terminal signals do not agree with each other, then the fine adjustment unit 32d determines and outputs an input terminal signal whose amount of a phase shift lies between the amounts of phase shifts of the compared input terminal signals. A process of determining such an input terminal signal will be described later on. The outputted input terminal signal from the fine adjustment unit 32d is supplied to second input terminals of the selectors 32a, 32e. When the subscriber device presence/absence signal S1 represents "absence", then the selectors 32a, 32e select and output the signal supplied to their first input terminals. When the subscriber device presence/absence signal S1 represents "presence", then the selectors 32a, 32e select and output the signal supplied to their second input terminals.

Operation of the memory/fine adjustment circuit 32 will be described below.

In a first frame, the subscriber device presence/absence signal S1 represents "absence" with respect to burst signals from any subscribers. In this case, the selectors 32a, 32e select and output the input terminal signal from the phase comparator 29. Therefore, the selector 32e sends the input terminal signal to the selector 30. The phase-comparison bit synchronizing circuit according to the first embodiment operates in the same manner as the conventional phase comparison bit synchronizing circuit shown in FIG. 9. However, the selector 32a sends the input terminal signal from the phase comparator 29 to the memory 32b, which stores the input terminal signal into the storage location in the memory 32b which corresponds to the subscriber that is indicated by the subscriber device selection signal S2 being transmitted at the time.

In a next frame, the subscriber device presence/absence signal S1 represents "presence" with respect to burst signals from any subscribers. In this case, the selectors 32a, 32e select and output the input terminal signal from the fine adjustment unit 32d. Since input terminal signals have already been stored in the respective storage locations of the memory 32b, the relevant subscriber device selector 32c reads the input terminal signal stored in the storage location in the memory 32b which corresponds to the subscriber that is indicated by the subscriber device selection signal S2, and outputs the read input terminal signal to the second input terminal of the fine adjustment unit 32d. The first input terminal of the fine adjustment unit 32d is supplied with the input terminal signal based on the burst signal in the next frame. If the burst signal is free of disturbance, then the input terminal signal supplied to the first input terminal of the fine adjustment unit 32d is the same as the input terminal signal which is supplied to the second input terminal thereof based on the burst signal in the preceding frame. The fine adjustment unit 32d then outputs the input terminal signal in the preceding frame which is supplied to the second input terminal thereof.

The optimum amount of a phase shift may possibly be varied gradually in subsequent frames from the value determined in the first frame, and the amount of a phase shift may be varied greatly by disturbance. If the input terminal signal in the present frame which is supplied to the first input terminal of the fine adjustment unit 32d differs from the input terminal signal in the preceding frame which is supplied to the second input terminal thereof, then the fine adjustment unit 32 corrects the input terminal signal in the present frame such that the amount of a phase shift thereof is close to that of the input terminal signal in the preceding frame, and outputs the corrected input terminal signal.

Figure 9:
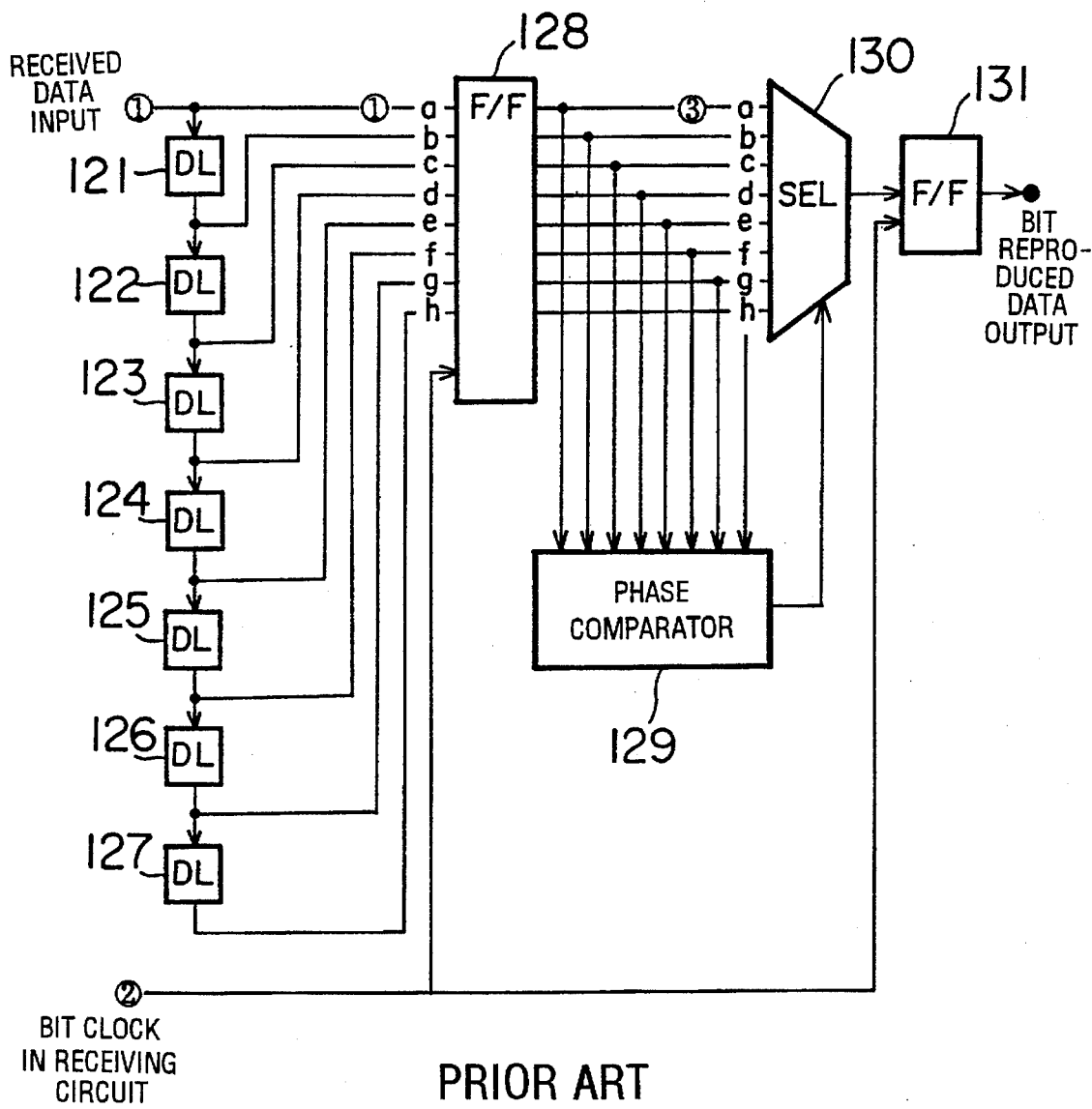
FIG. 9 is a block diagram of a conventional phase-comparison bit synchronizing circuit.
Figure 10:
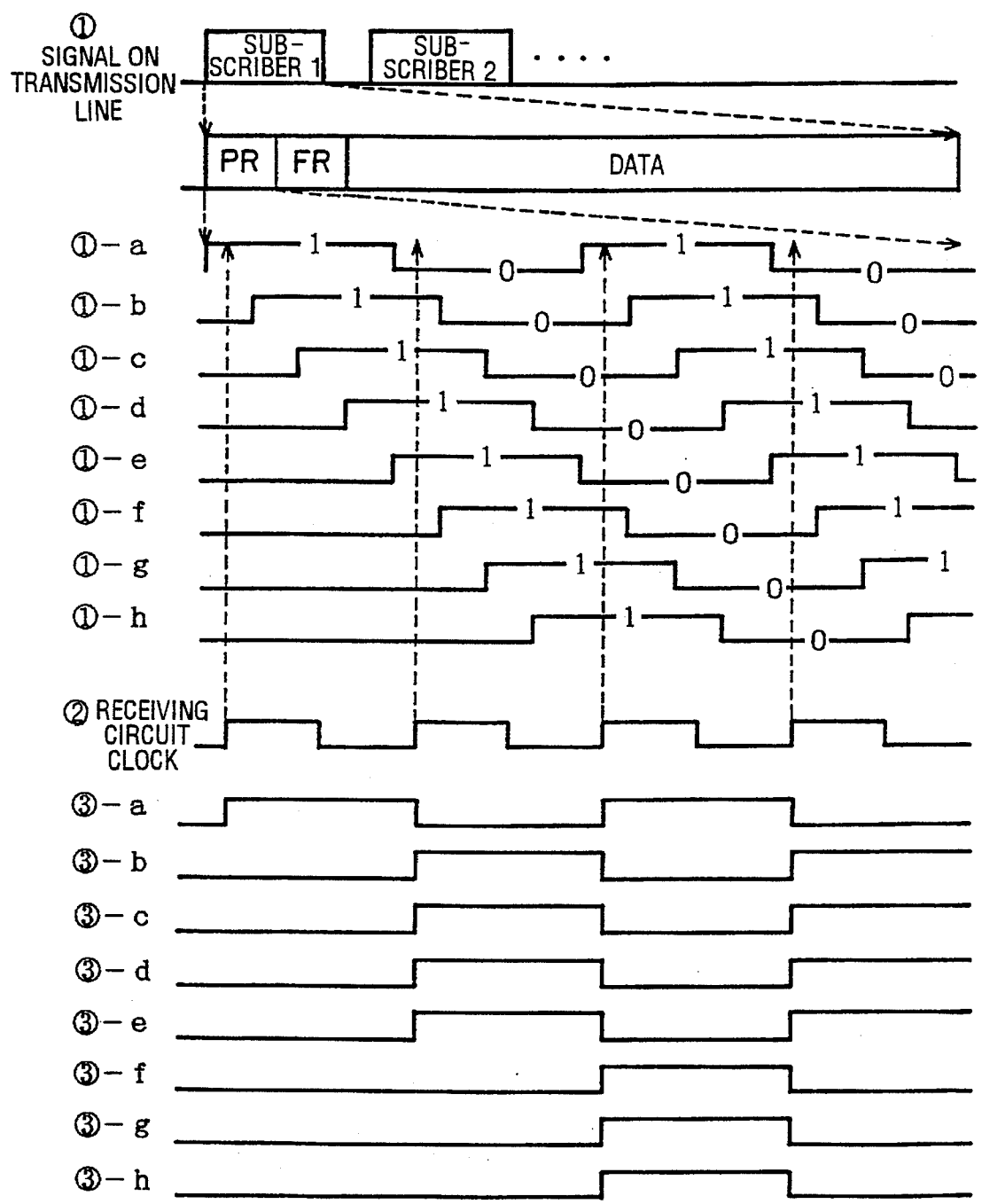
FIG. 10 is a timing chart of various signals in the conventional phase-comparison bit synchronizing circuit shown in FIG. 9.

For example, if it is assumed that the input terminal signal corresponding to the third input terminal, counted from above, of the selector 30 shown in FIG. 2, i.e., the input terminal supplied with a signal 3̂-c in FIG. 9, is selected and stored in the preceding frame, and that the input terminal signal corresponding to the sixth input terminal, counted from above, of the selector 30 in FIG. 2, i.e., the input terminal supplied with a signal 3̂-f in FIG. 9, is selected and stored in the present frame, then the fine adjustment unit 32d outputs the input terminal signal corresponding to the fourth input terminal, counted from above, of the selector 30 in FIG. 2, i. e., the input terminal supplied with a signal 3̂-d in FIG. 9.

The output signal from the fine adjustment unit 32d is transmitted through the selector 32e to the selector 30 for thereby selecting a signal to be supplied to an input terminal corresponding to a new input terminal signal, and is also supplied through the selector 32a to the corresponding storage location in the memory 32b where a new input terminal signal is stored.

As described above, even if the amount of a phase shift is varied greatly by disturbance, the memory/fine adjustment circuit 32 is not entirely affected by the greatly varied amount of a phase shift. The memory/fine adjustment circuit 32 can also sufficiently handle a situation in which the optimum amount of a phase shift is varied gradually in subsequent frames from the value determined in the first frame.

While the fine adjustment unit 32d is employed in the first embodiment, the fine adjustment unit 32d may be dispensed with, and the memory 32b may store only the input terminal signal in the first frame and not update the input terminal signal subsequently. Such a modification is incapable of handling a situation in which the optimum amount of a phase shift is varied gradually in subsequent frames from the value determined in the first frame, but is sufficiently effective to suppress disturbance-induced variations in the amount of a phase shift.

Figure 4:
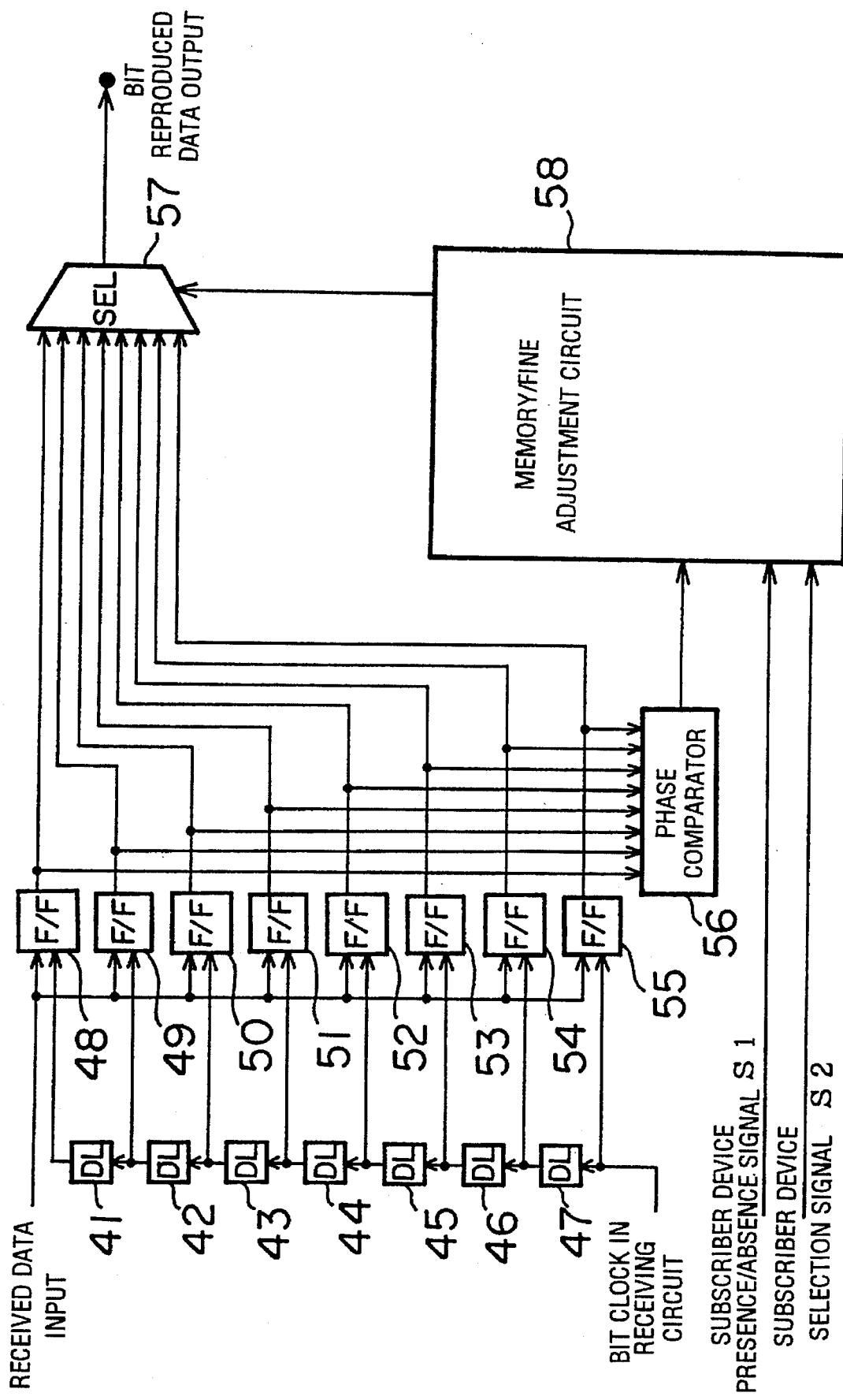
FIG. 4 is a block diagram of a phase-comparison bit synchronizing circuit according to a second embodiment of the present invention.

FIG. 4 shows in block form a phase-comparison bit synchronizing circuit according to a second embodiment of the present invention. According to the first embodiment, the phase of a received burst signal is shifted. According to the second embodiment, however, the phase of a received burst signal is not shifted, but a plurality of bit clock signals that are out of phase with each other are generated by shifting the phase of a bit block signal in the receiving circuit, and one of the bit block signals is selected to synchronize the centers of the bits of burst signals.

As shown in FIG. 4, a given burst signal which is inputted is supplied to the D terminals of eight parallel-connected D flip-flops (F/F) 48~55. A bit clock signal in the receiving circuit is supplied respectively to series-connected delay elements (DL) 41~47. The delay time of each of the delay elements 41~47 is one-eighth of the period of the bit clock signal in the receiving circuit. Seven bit clock signals produced by the delay elements 41~47 when the bit clock signal in the receiving circuit is shifted different phases by the delay elements 41~47, and the original bit clock signal are supplied to the respective clock terminals of the D flip-flops 48~55. The D flip-flops 48~55 synchronizes the signals supplied respectively to the D terminals thereof with positive-going edges of the bit clock signal supplied to the clock terminal thereof, and output signals which are the same as the output signals from the D flip-flop 28 according to the first embodiment shown in FIG. 2.

Figure 5:
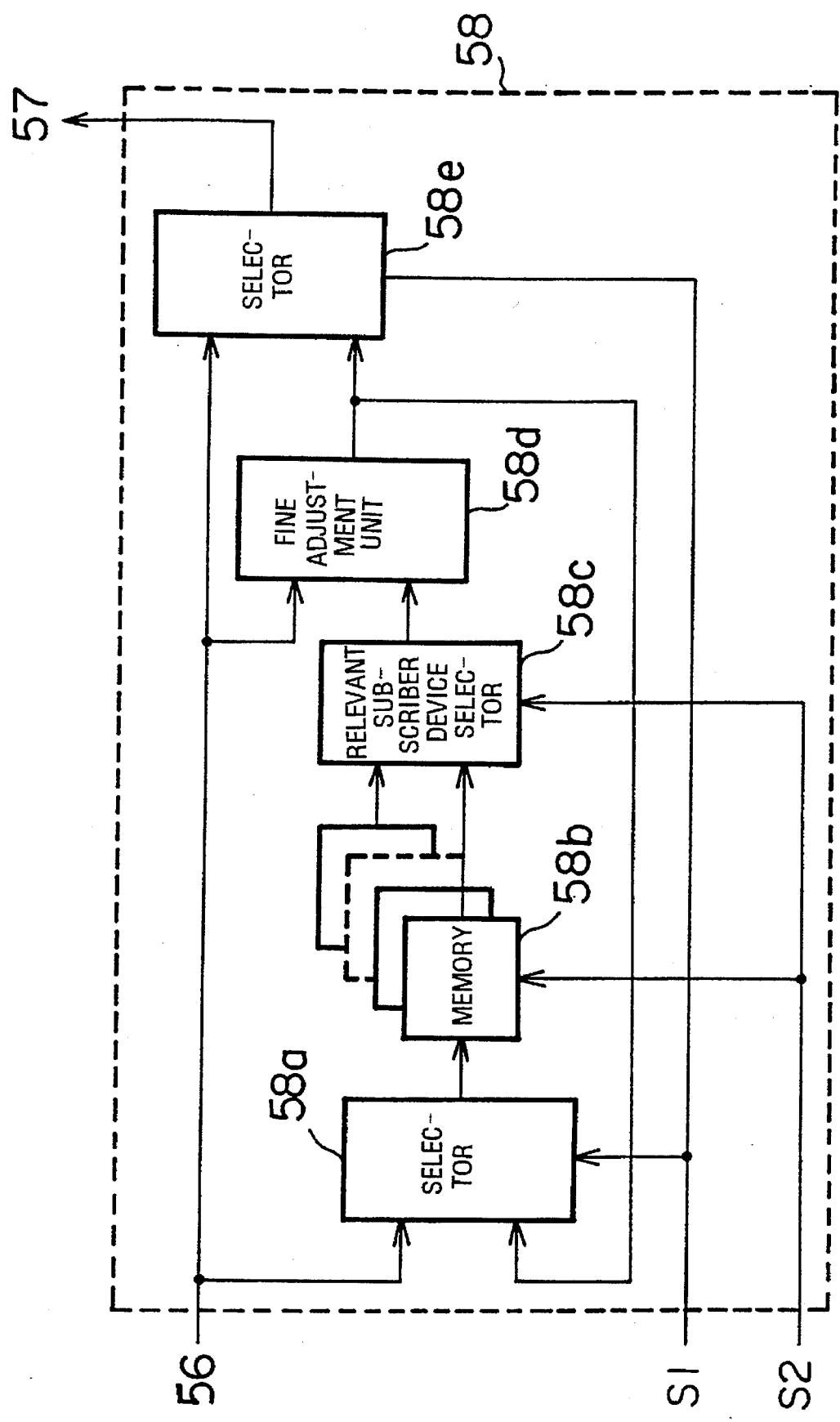
FIG. 5 is a block diagram of an internal arrangement of a memory/fine adjustment circuit in the phase-comparison bit synchronizing circuit according to the second embodiment.
Figure 6:
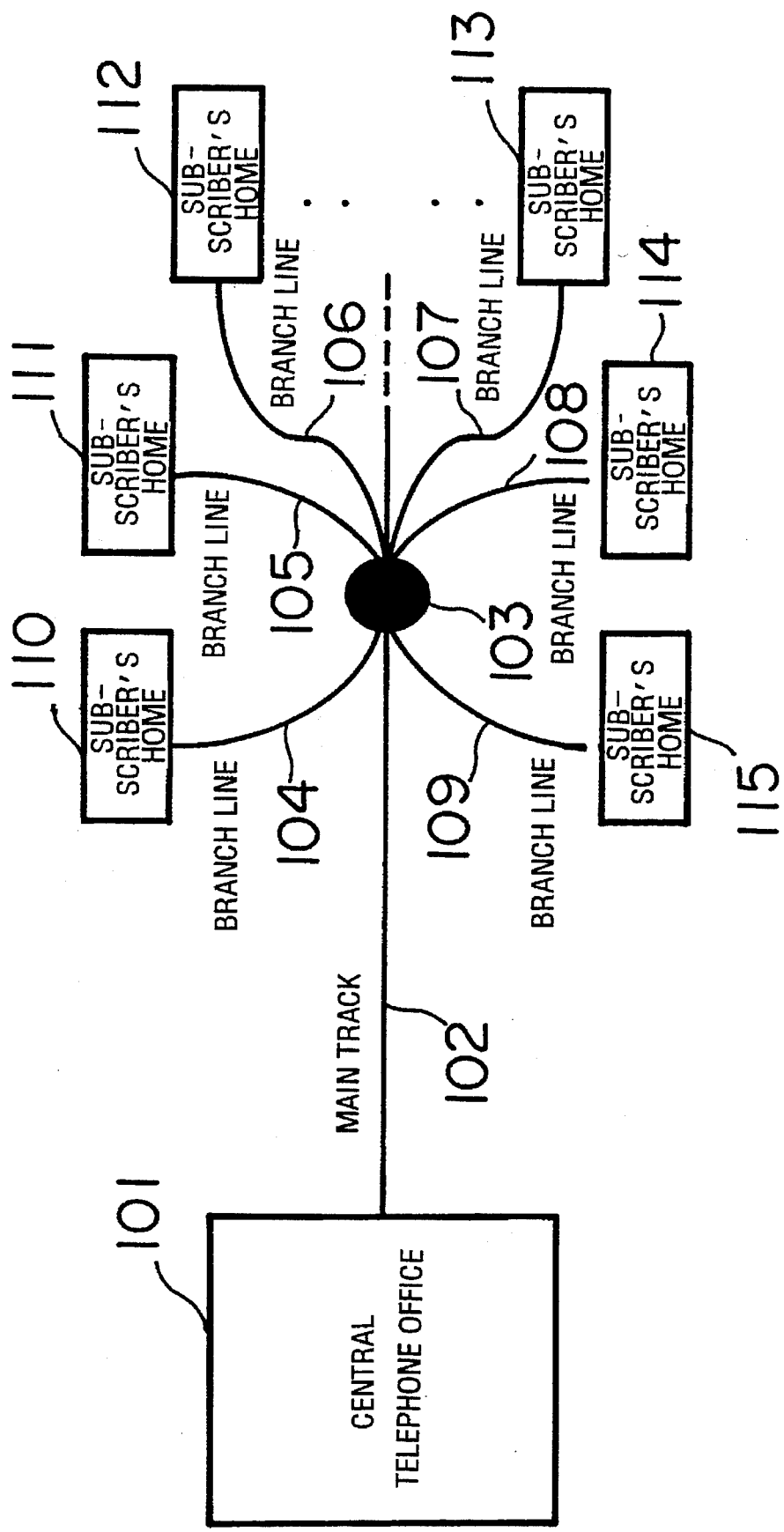
FIG. 6 is a block diagram showing how subscribers are accommodated in a passive optical network (PON)
Figure 7:
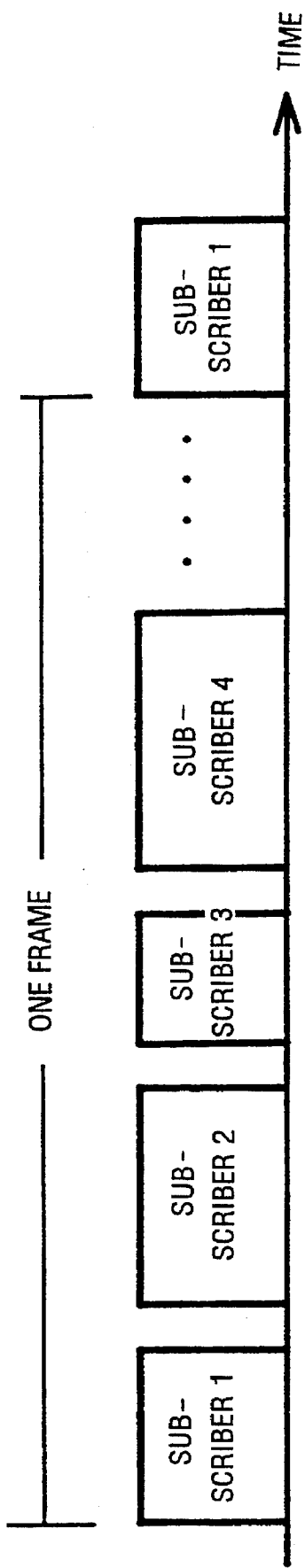
FIG. 7 is a diagram of a frame according to time-division multiplex access (TDMA)
Figure 8:
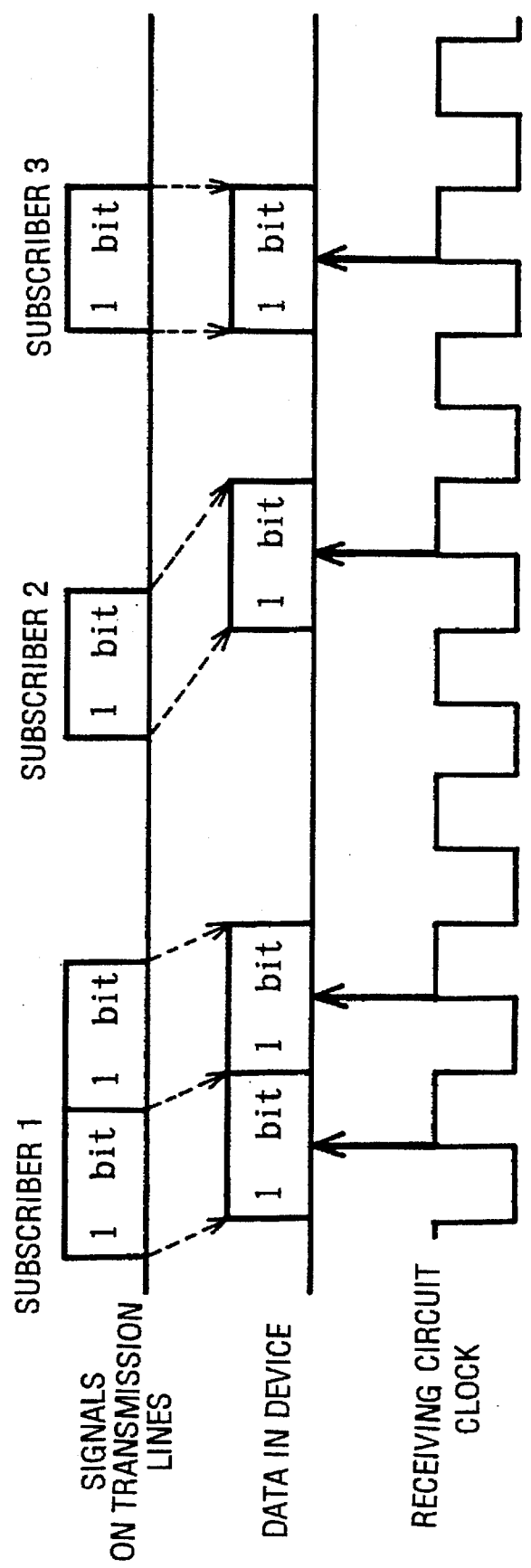
FIG. 8 is a diagram showing the principles of a phase-comparison bit synchronizing circuit.

As shown in FIG. 4, the phase-comparison bit synchronizing circuit according to the second embodiment has a phase comparator 56, a selector (SEL) 57, and a memory/fine adjustment circuit 58 which are identical in structure and function to the phase comparator 29, the selector 30, and the memory/fine adjustment circuit 32 according to the first embodiment. FIG. 5 shows in block form an internal arrangement of the memory/fine adjustment circuit 58 which is exactly the same as the memory/fine adjustment circuit 32 according to the first embodiment shown in FIG. 3.

In the second embodiment, the phase-comparison bit synchronizing circuit maintains the amount of a phase shift in subsequent frames for a high data reproducing capability against disturbance.

According to the present invention, as described above, the identification code of the phase shifting means that is determined by the determining means based on a given burst frame in a first frame is stored by the memory means, and when a burst signal in a next or succeeding received frame which corresponds to the given burst signal is inputted, the inputted burst signal is shifted by the phase shifting means whose identification code has been stored by the memory means, and synchronized in bit phase by the bit phase synchronizing means. A signal produced by thus shifting and synchronizing the inputted burst signal is selected by the second selecting/outputting means, and outputted as bit reproduced data. Specifically, when a next or succeeding frame is received, no new phase shifting means is determined by the determining means, but thephase shifting means whose identification code has been stored by the memory means and which has been used in the preceding frame is used with respect to a burst signal in the received frame which corresponds to the given burst signal.

Therefore, even when the next or succeeding received frame suffers disturbance, phase adjustment based on a wrong amount of a phase shift is avoided, and burst signals can be synchronized in appropriate bit phase. Burst signals are prevented from having different data error rates. Consequently, data can be reproduced properly even in the presence of disturbance.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A phase-comparison bit synchronizing circuit for establishing bit phase synchronization of signals transmitted by way of time-division multiplex access, comprising:

a plurality of phase shifting means for shifting the phase of a given burst signal in a received frame by respective amounts which are different from each other;

bit phase synchronizing means for synchronizing the bit phases of output signals from said plurality of phase shifting means based on a predetermined clock signal;

determining means for comparing output signals from said bit phase synchronizing means and determining an optimum phase shifting means from said plurality of phase shifting means which outputs a signal having a largest setup and hold margin for each of the plurality of phase shifting means with respect to the predetermined clock signal;

first selecting/outputting means for selecting a signal produced when said given burst signal is shifted in phase by the optimum phase shifting means, and synchronized in bit phase by said bit phase synchronizing means, and outputting the selected signal as bit reproduced data;

memory means for storing an identification code of the optimum phase shifting means; and second selecting/outputting means for selecting a signal produced when a burst signal in a succeeding received frame, which corresponds to said given burst signal, is shifted by a phase shifting means whose identification code has been stored by said memory means, and synchronized in bit phase by said bit phase synchronizing means, and outputting the selected signal as bit reproduced data.

2. A phase-comparison bit synchronizing circuit according to claim 1, wherein said plurality of phase shifting means, said bit phase synchronizing means, and said determining means operate with respect to the burst signal in a succeeding received frame which corresponds to said given burst signal, and wherein said second selecting/outputting means comprises:

comparing means for comparing the optimum phase shifting means with the phase shifting means having a identification code stored in said memory means, based on the burst signal in a succeeding received frame which corresponds to said given burst signal;

memory control means for controlling said memory means to store an identification code of a phase shifting means which has the amount of a shift between the amount of a shift of a newly determined one of the phase shifting means and the amount of a shift of the phase shifting means whose identification code has been stored by said memory means, if the phase shifting means compared by said comparing means are different from each other; and means for selecting a signal produced when a burst signal in a succeeding frame is shifted by the phase shifting means whose identification code has been newly stored by said memory means, and synchronized in bit phase by said bit phase synchronizing means, and outputting the selected signal as bit reproduced data, if the phase shifting means compared by said comparing means are different from each other.

3. A phase-comparison bit synchronizing circuit according to claim 1, wherein said determining means comprises means for comparing the output signals from said plurality of bit phase synchronizing means in an order based on amounts of shifts thereof to identify those output signals which vary in phase at the same time, and selecting a phase shifting means corresponding to the output signal which is 180° out of phase with said output signals which vary in phase at the same time, as the optimum phase shifting means.

4. A phase-comparison bit synchronizing circuit for establishing bit phase synchronization of signals transmitted by way of time-division multiplex access, comprising:

a plurality of phase shifting means for shifting the phase of a reference clock signal by respective amounts which are different from each other;

a plurality of bit phase synchronizing means for synchronizing the bit phase of a given burst signal in a received frame based on respective output signals from said plurality of phase shifting means;

determining means for comparing output signals from said plurality of bit phase synchronizing means and determining an optimum bit phase synchronizing means from said plurality of bit phase synchronizing means which outputs a signal having a largest setup and hold margin of each of the plurality of bit phase synchronizing means with respect to the predetermined clock signal;

first selecting/outputting means for selecting a signal produced when said given burst signal is synchronized in bit phase by the optimum bit phase synchronizing means and outputting the selected signal as bit reproduced data;

memory means for storing an identification code of the optimum bit phase synchronizing means; and second selecting/outputting means for selecting a signal produced when a burst signal in a succeeding received frame, which corresponds to said given burst signal, is synchronized in bit phase by a bit phase synchronizing means whose identification code has been stored by said memory means, and outputting the selected signal as bit reproduced data.

5. A phase-comparison bit synchronizing circuit according to claim 4, wherein said plurality of phase shifting means, said plurality of bit phase synchronizing means, and said determining means operate with respect to the burst signal in a succeeding received frame which corresponds to said given burst signal, and wherein said second selecting/ outputting means comprises:

comparing means for comparing the optimum bit phase synchronizing means with the optimum bit phase synchronizing means whose identification code has been stored by said memory means, based on the burst signal in a succeeding received frame which corresponds to said given burst signal;

memory control means for controlling said memory means to store an identification code of a bit phase synchronizing means which has the amount of a shift between the amount of a shift of a newly determined one of the plurality of bit phase synchronizing means and the amount of a shift of the bit phase synchronizing means whose identification code has been stored by said memory means, if the bit phase synchronizing means compared by said comparing means are different from each other; and means for selecting a signal produced when a burst signal in a succeeding frame is synchronized in bit phase by the bit phase synchronizing means whose identification code has been newly stored by said memory means, and outputting the selected signal as bit reproduced data, if the bit phase synchronizing means compared by said comparing means are different from each other.

6. A phase-comparison bit synchronizing circuit according to claim 4, wherein said determining means comprises means for comparing the output signals from said plurality of bit phase synchronizing means in an order based on amounts of shifts of a corresponding phase shifting means to identify those output signals which vary in phase at the same time, and selecting a bit phase synchronizing means corresponding to the output signal which is 180° out of phase with said output signals which vary in phase at the same time, as the optimum bit phase synchronizing means.

* * * * *

UNITED STATES PATENT AND TRADEMARK OFFICE
CERTIFICATE OF CORRECTION

PATENT NO. : 5,657,318

DATED : August 12, 1997

INVENTOR(S) : Hisakazu OHMORI, et al.

It is certified that error appears in the above-indentified patent and that said Letters Patent is hereby corrected as shown below:

<u>Column 2</u>

Line 29, "$\hat{1}$-a~$\hat{1}$-h" should be --①-a~①-h--.

Line 32, "$\hat{2}$" should be --②--; and "$\hat{1}$" should be --①--;

Line 42, "$\hat{3}$-a~$\hat{3}$-h" should be --③-a~③-h--;

Line 50, "$\hat{3}$-a~$\hat{3}$-h" should be --③-a~③-h--;

Line 53, "$\hat{3}$-a, $\hat{3}$-b," should be --③-a, ③-b,--; and "$\hat{3}$-e, $\hat{3}$-f," should be --③-e, ③-f--;

Line 60, "$\hat{3}$-c" should be --③-c--;

Line 61, "$\hat{3}$-d or the signal or $\hat{3}$-h" should be --③-d or the signal ③-g or ③-h--

<u>Column 3</u>

Line 19, "$\hat{1}$" should be --①--.

<u>Column 7</u>

Line 51, "$\hat{3}$" should be --③--;

Line 55, "$\hat{3}$" should be --③--;

UNITED STATES PATENT AND TRADEMARK OFFICE
CERTIFICATE OF CORRECTION

PATENT NO. : 5,657,318
DATED : August 12, 1997
INVENTOR(S) : Hisakazu Ohmori, et. al.

It is certified that error appears in the above-identified patent and that said Letters Patent is hereby corrected as shown below:

Line 59, "$\hat{3}$" should be --$\hat{3}$--;

Signed and Sealed this

Thirteenth Day of January, 1998

Attest:

BRUCE LEHMAN

Attesting Officer

Commissioner of Patents and Trademarks